(12) United States Patent
Ookubo

(10) Patent No.: US 11,712,774 B2
(45) Date of Patent: Aug. 1, 2023

(54) SPECTACLE LENS PRODUCING METHOD, SPECTACLE LENS PRODUCING SYSTEM, AND SPECTACLE LENS

(71) Applicant: HOYA LENS THAILAND LTD., Pathumthani (TH)

(72) Inventor: Shigeki Ookubo, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 486 days.

(21) Appl. No.: 16/621,347

(22) PCT Filed: Jun. 28, 2017

(86) PCT No.: PCT/JP2017/023755
§ 371 (c)(1),
(2) Date: Dec. 11, 2019

(87) PCT Pub. No.: WO2019/003343
PCT Pub. Date: Jan. 3, 2019

(65) Prior Publication Data
US 2020/0166775 A1    May 28, 2020

(51) Int. Cl.
*B24B 13/00* (2006.01)
*G02C 7/02* (2006.01)
(Continued)

(52) U.S. Cl.
CPC .......... *B24B 13/0055* (2013.01); *B24B 13/06* (2013.01); *B29D 11/00317* (2013.01);
(Continued)

(58) Field of Classification Search
CPC ........ B29D 11/00317; B29D 11/00326; B29D 11/00336; B29C 59/16; B24B 13/06; B24B 13/0055
See application file for complete search history.

(56) References Cited

U.S. PATENT DOCUMENTS

2002/0057481 A1* 5/2002 Souda .................. G02B 26/105
                                                    359/212.2
2004/0032566 A1    2/2004 Nakada et al.
(Continued)

FOREIGN PATENT DOCUMENTS

DE    10 2010 010 337 A1    9/2011
EP       1 762 337 A1    3/2007
(Continued)

OTHER PUBLICATIONS

Jan. 21, 2021 Extended Search Report issued in European Patent Application No. 17916366.2.
(Continued)

*Primary Examiner* — Mathieu D Vargot
(74) *Attorney, Agent, or Firm* — Oliff PLC

(57) ABSTRACT

The present invention is a method for producing a spectacle lens from a lens material, and includes: a marking step (step S10) of marking an identification mark for identifying the spectacle lens, and a processing information mark which is used to process a lens blank and includes a tray identification 2D code, a tray identification code, a shape line and a position mark by forming a hole or a groove in a convex surface of the lens material by laser; and a concave surface machining processing step (step S13) of reading the processing information mark, and machining a concave surface of the lens blank based on the read processing information mark.

10 Claims, 4 Drawing Sheets

(51) Int. Cl.
  *B29D 11/00* (2006.01)
  *B24B 13/005* (2006.01)
  *G01N 21/958* (2006.01)
  *G02C 13/00* (2006.01)
  *G06K 19/06* (2006.01)
  *B24B 13/06* (2006.01)
  *B29C 59/16* (2006.01)

(52) U.S. Cl.
  CPC .. *B29D 11/00326* (2013.01); *B29D 11/00336* (2013.01); *G01N 21/958* (2013.01); *G02C 7/021* (2013.01); *G02C 7/024* (2013.01); *G02C 13/003* (2013.01); *G06K 19/06121* (2013.01); *B24B 13/0012* (2013.01); *B29C 59/16* (2013.01); *B29D 11/00961* (2013.01); *G01N 2021/9583* (2013.01)

(56) References Cited

U.S. PATENT DOCUMENTS

| | | | |
|---|---|---|---|
| 2005/0073646 | A1 | 4/2005 | Nakada et al. |
| 2006/0189255 | A1 | 8/2006 | Akiyama |
| 2008/0051012 | A1* | 2/2008 | Akiyama ............... B24B 9/148 451/6 |
| 2014/0199521 | A1 | 7/2014 | Carpenter |
| 2014/0300856 | A1* | 10/2014 | Dangelmaier ......... G02C 7/021 351/159.42 |
| 2016/0003979 | A1 | 1/2016 | Hamakubo et al. |
| 2016/0116762 | A1 | 4/2016 | Dangelmaier et al. |
| 2016/0207249 | A1 | 7/2016 | Maurice et al. |
| 2017/0261765 | A1 | 9/2017 | Dangelmaier et al. |

FOREIGN PATENT DOCUMENTS

| | | |
|---|---|---|
| JP | H08-294977 A | 11/1996 |
| JP | 2000-131653 A | 5/2000 |
| JP | 2000-284234 A | 10/2000 |
| JP | 2003-084243 A | 3/2003 |
| JP | 2003-270592 A | 9/2003 |
| JP | 2005-293735 A | 10/2005 |
| JP | 2006-047782 A | 2/2006 |
| JP | 2006-053227 A | 2/2006 |
| JP | 2006-126645 A | 5/2006 |
| JP | 2014-164271 A | 9/2014 |
| JP | 2015-503127 A | 1/2015 |
| JP | 2015-509213 A | 3/2015 |
| WO | 2005/084885 A1 | 9/2005 |
| WO | 2013/112328 A1 | 8/2013 |
| WO | 2016/142496 A1 | 9/2016 |

OTHER PUBLICATIONS

Aug. 15, 2017 Written Opinion of the International Searching Authority issued in International Patent Application No. PCT/JP2017/023755.
Oct. 27, 2021 Office Action issued in Japanese Patent Application No. 2019-526032.
Aug. 15, 2017 International Search Report issued in International Patent Application No. PCT/JP2017/023755.
May 20, 2022 Office Action issued in European Patent Application No. 17916366.2.
May 23, 2022 Office Action issued in European Patent Application No. 22155526.1.
May 23, 2022 Office Action issued in European Patent Application No. 22155529.5.

\* cited by examiner

SPECTACLE LENS PRODUCING METHOD, SPECTACLE LENS PRODUCING SYSTEM, AND SPECTACLE LENS

BACKGROUND

Technical Field

The present disclosure relates to a spectacle lens producing method and a spectacle lens producing system which polish a lens material and produce a spectacle lens, and a spectacle lens.

Related Art

JP 2006-53227 A discloses a method for producing a spectacle lens from a lens blank using a laser marking technique. This method first machines and polishes a convex surface of the lens blank, and performs laser marking of a reference mark which is a reference for position alignment in a subsequent processing process, on the convex surface subjected to the machining and polishing processing. Furthermore, the position alignment is performed based on this reference mark to perform the machining and polishing processing on the concave surface. When machining and polishing both surfaces are finished, dyeing, hard coating and an antireflection film are applied to the lens blank.

Furthermore, a mark which is referred to as a hidden mark or an engraving mark is marked on the spectacle lens produced in this way. The hidden mark includes, for example, a reference mark for specifying a fitting point position on a lens surface of a progressive addition spectacle lens, and a symbol indicating addition power such as a management code which is as disclosed in JP 2000-284234 A and is used to identify a spectacle lens.

In this regard, the method disclosed in Patent Literature 1 performs marking twice including marking performed after machining and polishing the convex surface, and marking performed after applying dyeing, hard coating and the antireflection film. Hence, there is a problem that a more work is required for production, and cost is required to maintain a laser irradiation device.

SUMMARY

One embodiment of the present invention has been made in light of the above problem, and an object of the one embodiment of the present invention is to provide a method for producing a spectacle lens from a lens blank using a laser marking technique which does not require a producing work and cost.

A spectacle lens producing method according to one embodiment of the present invention is a method for producing a spectacle lens from a lens material, and includes: a marking step of marking an identification information mark and a processing information mark by forming a hole or a groove in a convex surface of the lens material by laser, the identification information mark being used for identifying the spectacle lens and the processing information mark being used to process the lens material; and a concave surface machining step of reading the processing information mark, and machining a concave surface of the lens material based on the read processing information mark.

A spectacle lens producing system according to one embodiment of the present invention is a system which produces a spectacle lens from a lens material, and includes: a design information database in which an identification information mark for identifying the spectacle lens and prescription information of the spectacle lens are associated and recorded; a marking device which marks an identification information mark and a processing information mark by forming a hole or a groove in a convex surface of the lens material by laser, the identification information mark being used for identifying the spectacle lens and the processing information mark being used to process the lens material; and a concave surface machining device which reads the processing information mark, and machines a concave surface of the lens material based on the read processing information mark.

According to the above configuration, the identification information mark and the processing information mark are marked in one step before the concave surface machining step, so that it is possible to reduce a laser marking work. Furthermore, it is possible to mark the processing information mark and mark the identification information mark together, and one laser irradiation device can perform this marking, so that it is possible to reduce maintenance cost of the laser irradiation device.

Furthermore, a spectacle lens according to one embodiment of the present invention is a spectacle lens which is formed by machining a concave surface of a lens material, an identification information mark and a processing information mark are marked by forming a hole or a groove in a convex surface, the identification information mark being used for identifying the spectacle lens and the processing information mark being used to process the lens material, a diameter of a hole or a width of the groove is less than 70 μm, and a depth of the hole or the groove is 0.1 μm or more and 3 μm or less.

According to the above one embodiment, there is provided a method for producing a spectacle lens from a lens blank using a laser marking technique which does not require a producing work and cost.

DETAILED DESCRIPTION

One embodiment of a method and a system which polish a lens material and produce a spectacle lens according to the present invention will be described in detail below. The present embodiment will be described as an example of a case where a plastic progressive addition spectacle lens is produced.

Figure 1:
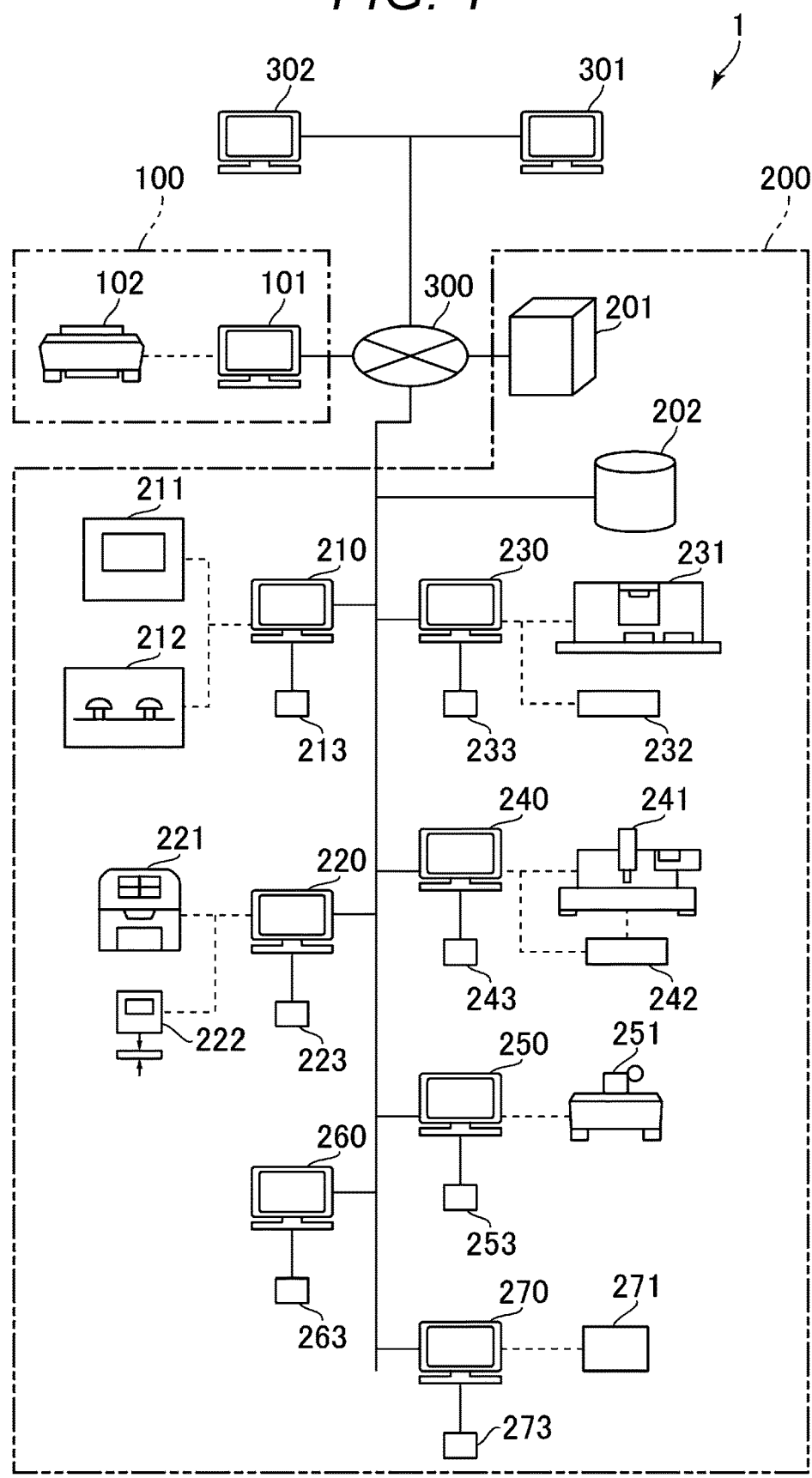
FIG. 1 illustrates a schematic view illustrating one embodiment of a spectacle lens producing system according to the present invention.

FIG. 1 illustrates a schematic view illustrating one embodiment of a spectacle lens producing system according to the present invention. As illustrated in FIG. 1, in a spectacle lens producing system 1 according to the present embodiment, for example, an order terminal 101, a spectacle lens design device 201, a design information database 202, control terminals 210, 220, 230, 240, 250 and 270 connected with each processing device, a display terminal 260, reading devices 213, 223, 233, 243, 253, 263 and 273 connected with each of the control terminals 210, 220, 230, 240, 250 and 270 and the display terminal 260, a user terminal 301 and an assist terminal 302 are provided and connected so as to be able to communicate via a network 300 such as the Internet.

The order terminal 101 is, for example, a personal computer installed at a spectacle shop 100. The order terminal 101 includes a display unit, an input unit and a communication control unit. The display unit displays a guide screen which assists to input prescription information (spectacle lens prescription information) of subject eyes which is necessary to order a spectacle lens. The input unit inputs spectacle prescription data including the prescription information of the subject eyes and specification information of a spectacle frame according to the guide screen. The communication control unit controls data communication with the spectacle lens design device 201 via the network 300. The communication control unit associates, for example, user information such as client identification information and store identification information, and the inputted spectacle prescription data with lens identification information unique to the spectacle lens to transmit to the spectacle lens design device 201. The order terminal 101 is connected with a frame shape measurement instrument 102.

The spectacle lens design device 201 is installed in a factory 200, and includes a storage unit, a calculation control unit and a communication unit. The storage unit stores a design program and a processing data generating program. The design program is a program which causes the calculation control unit to obtain the prescription information of a pair of left and right subject eyes, and create (design processing) design data of each spectacle lens based on the obtained prescription information. The processing data generating program is a program which causes the calculation control unit to generate processing data which is necessary when the lens processing device actually processes the lens, based on the design data created by the design program.

The calculation control unit executes the above design processing by executing the design program, and creates design data. Furthermore, the calculation control unit generates processing data as control information of the lens processing device by executing the processing data generating program.

The communication unit associates the user information and the spectacle lens prescription information including the spectacle prescription data, the design data and the processing data with the lens identification information to store in the design information database 202.

The control terminals 210, 220, 230, 240, 250 and 270 are installed in the factory 200, and can obtain the processing data associated with the tray identification code or the lens identification information by referring to the design information database 202. Each of the control terminals 210, 220, 230, 240, 250 and 270 includes a storage unit, a device control unit and a communication unit. An identification information reading program and a device control program are stored in the storage unit. The identification information reading program is a program which causes the reading devices 213, 223, 233, 243, 253 and 273 to read a tray identification code or lens identification information from the tray identification code or an identification information mark displayed on the lens blank or a tray (an operation instruction). The device control program is a program for obtaining the processing data associated with the processing device connected via the communication unit based on the read tray identification code or lens identification information, and controlling the processing device based on the processing data. The device control unit reads the tray identification code or the lens identification information by executing the identification information reading program. Furthermore, by executing the device control program, the device control unit obtains the processing data associated with the tray identification code or the lens identification information via the communication unit, and controls the processing device based on the processing data.

The control terminal 210 is connected with a curve generator 211 and a sanding polishing machine 212 as the processing devices. The control terminal 220 is connected with inspection devices such as a lens meter 221 and a thickness meter 222 as the processing devices. The control terminal 230 is connected with a laser marking device 231 and an image processing device 232 as the processing devices. The control terminal 240 is connected with a lens grinding device 241 of NC (Numerical Control) control including a machining center, and a chuck interlock 242 as the processing devices. The control terminal 250 is connected with a shape measurement instrument 251 of a V block top as the processing device. The control terminal 270 is connected with a printer 271 as the processing device.

The display terminal 260 is installed in the factory 200, and can obtain the processing data associated with the tray identification code or the lens identification information by referring to the design information database 202. Each display terminal 260 includes a storage unit, a display control unit and a communication unit. An identification information reading program and a display control program are stored in the storage unit. The identification information reading program is a program which causes the reading device 263 to read the tray identification code or the lens identification information from a tray identification code or the identification information mark displayed on the lens blank or the tray (an operation instruction conveyed together with the tray). The display control program is a program for obtaining processing data associated with the tray identification code or the lens identification information via the communication unit based on the read tray identification code or lens identification information, and displaying the processing data. The display control unit reads the tray identification code or the lens identification information by executing the identification information reading program. Furthermore, by executing the display control program, the device control unit obtains the processing data associated with the tray identification code or the lens identification information via the communication unit, and displays the processing data.

The user terminal 301 includes an input unit, a display unit and a communication unit. The input unit is, for example, a keyboard, and receives an input of lens identification information. The communication unit refers to the design information database 202 via the network 300, and obtains spectacle lens prescription information associated with the lens identification information. The display unit can display the received spectacle lens prescription information.

The assist terminal 302 includes an input unit, a display unit and a communication unit. The input unit is, for example, a keyboard, and receives an input of lens identification information. The communication unit refers to the design information database 202 via the network 300, and obtains spectacle lens prescription information associated with the lens identification information. The display unit can display the received spectacle lens prescription information.

Next, the present embodiment will be described with regard to marking to be applied to the lens blank.

Figure 2:
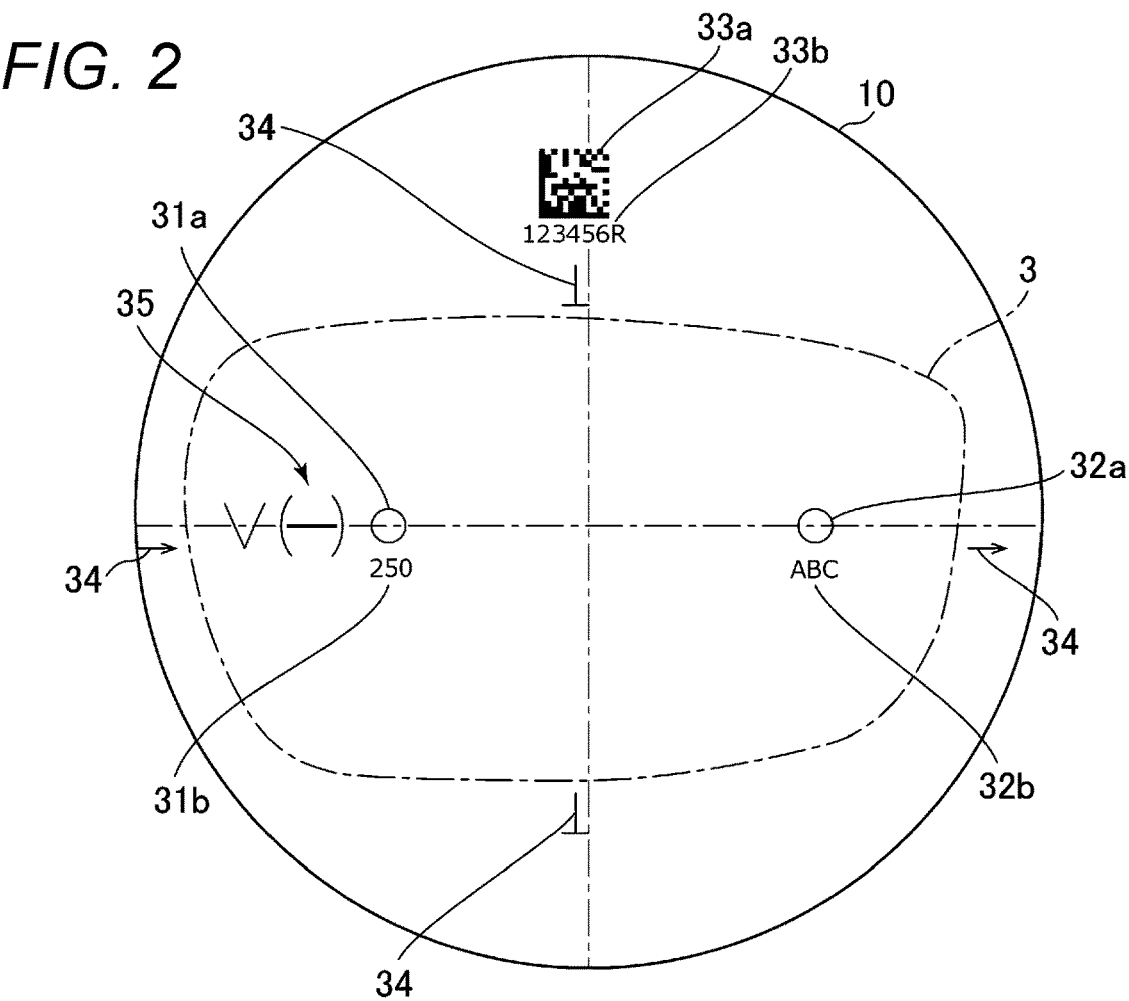
FIG. 2 illustrates a view illustrating marking applied to a lens blank.

A lens blank 10 is applied laser marking in a marking process (step S10) described below. FIG. 2 illustrates a view illustrating marking applied to the lens blank. As illustrated in FIG. 2, a processing information mark used during lens processing, a progressive power information mark related to a progressive addition lens and an identification information mark for identifying a spectacle lens are marked on the lens blank 10.

The processing information mark includes a tray identification 2D code 33a, a tray identification code 33b, a shape line 3 and position marks 34.

In a spectacle lens producing process described below, the lens blank 10 is put in a tray and conveyed. The tray identification code 33b is an identification number for identifying this tray. Furthermore, the tray identification 2D code 33a is a two-dimensional code such as a data matrix or a QR code indicating a tray identification code.

The shape line 3 is a line which indicates a shape area formed by enlarging a lens shape which is mounted in a spectacle frame by approximately 5 to 10%. Even when various inspections described below find a failure, and when this failure is an outer side of the shape line 3, it is possible to decide that the failure does not influence capability of the spectacle lens.

The position marks 34 are marks which indicate a center (a frame center or a boxing center) of the spectacle lens which is mounted in the spectacle frame. The upper and lower position marks 34 have reverse T shapes, and the left and right position marks 34 are arrows. Thus, it is possible to distinguish whether the spectacle lens is left one or right one, and upper and lower sides of the lens.

The progressive power information mark includes alignment reference marks 31a and 32a of the progressive addition lens, and addition power or addition power display marks 31b and 32b which are abbreviations of the addition power. It is defined to display these alignment reference marks 31a and 32a and the addition power display marks 31b and 32b on the progressive addition spectacle lens by, for example, JIS7315.

Figure 3:
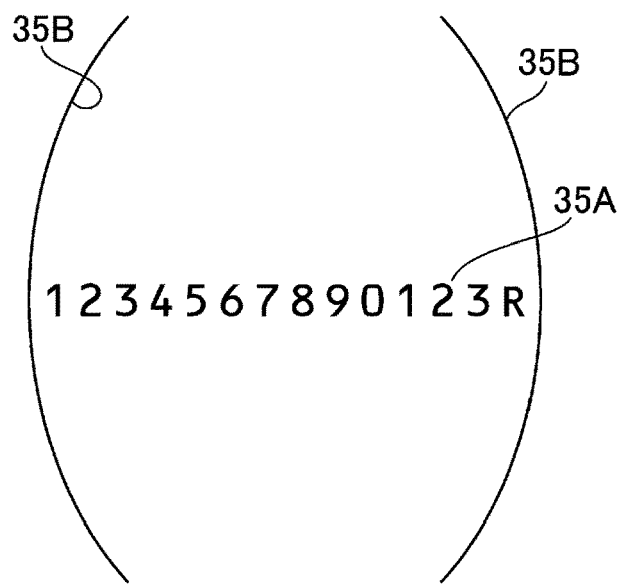
FIG. 3 illustrates an enlarged view of an identification mark in FIG. 2.

The identification information mark includes an identification mark 35 which indicates the lens identification information. FIG. 3 illustrates an enlarged view of an identification mark in FIG. 2. As illustrated in FIG. 3, the identification mark 35 includes an identification number 35A indicated in a horizontal direction, and a pair of arc portions 35B displayed at both side portions of the identification number 35A. The identification number 35A is a unique number assigned to each spectacle lens, and corresponds to the lens identification information. In addition, when automatic authentication is performed by OCR, the identification number 35A is desirably written in an OCRB font.

The progressive power information mark and the identification information mark are marked on the inner side of the shape line 3. The tray identification 2D code 33a and the tray identification code 33b of the processing information mark, and the position marks 34 are marked on the outer side of the shape line 3.

These marks displayed on the lens blank are marked by laser marking. According to the laser marking, the laser irradiation device performs pulse irradiation of laser to continuously form dots (holes) and thereby perform marking. The laser irradiation device may perform marking by forming dots at predetermined intervals or by narrowing pulse irradiation intervals and thereby continuously forming dots as grooves.

In this regard, when a dot diameter is large, each mark becomes large and distinctive, and undermines aesthetics and user-friendliness of the spectacle lens. Hence, the diameter of the dot or the width of the groove formed by laser is desirably less than 70 μm and is more desirably 5 to 30 μm. Furthermore, the depth of the hole or the groove formed by the laser is desirably 0.1 μm to 3 μm. According to a dimension of such a dot or groove, it is possible to view each mark even when dyeing, hard coating and AR coating are performed.

Conventionally, marking on a lens has been performed by $CO_2$ laser. However, the $CO_2$ laser has not been able to form the dot or the groove of the above dimension. Hence, to select laser conditions which make it possible to form dots or grooves having this dimension, the inventors have performed laser marking on a lens by setting a pulse width of pulse laser at a nano second order, a pico second order and a femto second order, and setting a wavelength of the laser to 1064 nm, 532 nm, 355 nm, 266 nm and 193 nm. As a result, it has been found that it is desirable to perform laser marking under following conditions.

In a case where the pulse width is at the nano order (equal to or more than $10^{-9}$ seconds and less than $10^{-6}$ seconds), if the wavelength is set to 1064 nm or 532 nm, the laser transmits through a lens. By contrast with this, in a case where the wavelength is set to 355 nm, there has been a slight thermal influence, yet marking has been possible. In a case where the wavelength is set to 266 nm or 193 nm, good marking has been possible. Hence, in a case where the pulse width is at the nano order (equal to or more than $10^{-9}$ seconds and less than $10^{-6}$ seconds), the wavelength is preferably 355 nm or less and is more preferably 266 nm or less.

In a case where the pulse width is at the pico order (equal to or more than $10^{-12}$ seconds and less than $10^{-9}$ seconds), if the wavelength is set to 1064 nm, there is a significant thermal influence such as a crack, yet marking has been possible. In this regard, even in a case where the wavelength is 1064 nm, and the pulse width is equal to or more than $10^{-12}$ seconds and less than $10^{-10}$ seconds, good marking has been possible. Furthermore, in a case where the wavelength is set to 532 nm or 355 nm, good marking has been possible. Hence, in a case where the pulse width is at the pico order (equal to or more than $10^{-12}$ seconds and less than $10^{-9}$ seconds), the wavelength is preferably 1064 nm or less and is more preferably 532 nm or less.

In a case where the pulse width is at the femto order (equal to or more than $10^{-15}$ seconds and less than $10^{-12}$ seconds), if the wavelength is set to 1064 nm, there has been a thermal influence, yet marking has been possible. Furthermore, in a case where the wavelength is set to 532 nm or 355 nm, good marking has been possible. Hence, in a case where the pulse width is at the femto order (equal to or more than $10^{-15}$ seconds and less than $10^{-12}$ seconds), the wavelength is preferably 1064 nm or less and is more preferably 532 nm or less.

Figure 4:
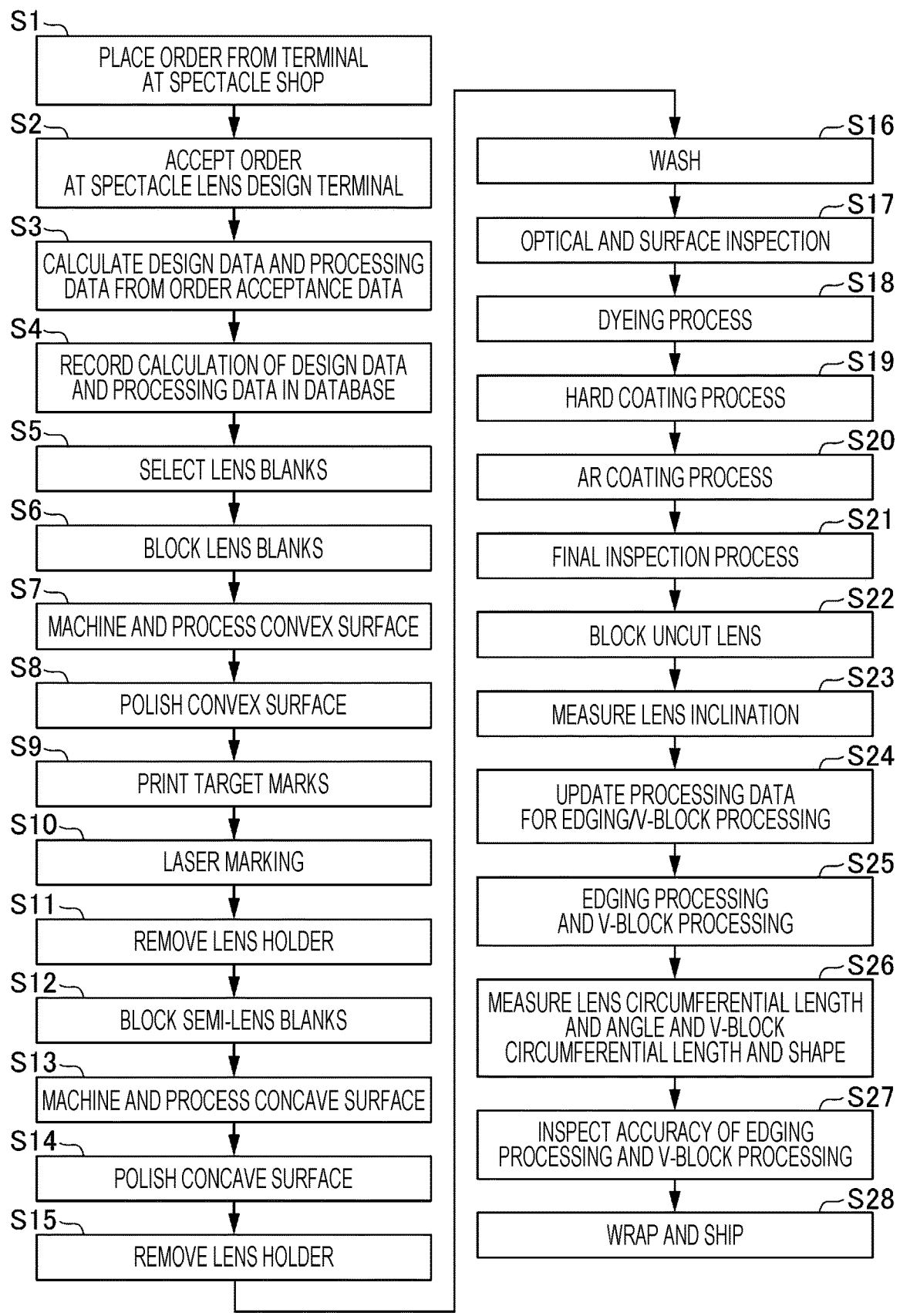
FIG. 4 is a flowchart illustrating a flow from order acceptance to delivery of a product.

Next, a flow from order acceptance to delivery of a product will be described. FIG. 4 is a flowchart illustrating the flow from order acceptance to delivery of the product.

First, the display unit of the order terminal 101 at the spectacle shop 100 displays an input screen. A salesperson inputs spectacle prescription data including prescription information of subject eyes of a client, and specification information of a spectacle frame such as shape data of the spectacle frame measured by the frame shape measurement instrument 102 according to a guidance of this input screen, and places an order (step S1).

The specification information of the spectacle frame includes a product code for specifying a V-block type, a V-block position, three-dimensional frame shape information, an antireflection film type, a lens color type, and a spectacle lens type. Furthermore, the prescription information of the subject eyes includes spherical power, columnar power, a cylindrical axis, addition power, an inter-pupil distance and an unaided vision of the left and right eyes of the client. The inputted specification information of the spectacle frame and prescription information of the subject eyes are transferred online together with lens identification information such as client identification information and store identification information to the spectacle lens design device 201 of the factory 200 via the network 300 (step S2).

The spectacle lens design device 201 calculates design data of each spectacle lens and processing data used by the lens processing device based on the specification information of the spectacle frame, and the prescription information of the subject eyes (step S3). The design data of the spectacle lens includes information related to shapes such as a concave surface shape and a convex surface shape of the spectacle lens, and a spectacle frame shape.

The processing data may include at least following information.

- A type and a mounting angle of a lens holder (lens blocking processing data) to be mounted in the lens blank
- Data (grinding/polishing processing data) for a processing machine related to a curve and a thickness for performing grinding and polishing processing on the lens
- Information (inspection processing data) of a prescription value and a standard value to be compared with a measurement value during optical inspection (an aberration, power and the thickness) after polishing processing
- Marking information (laser marking processing data) for performing laser marking on the lens blank including a processing information mark, a progressive power information mark and an identification information mark
- Information (dyeing processing data) related to a color type/density information during dyeing, and a dyeing time
- Information of a hard coating type (hard coating processing data)
- Information of an AR coating type (AR coating processing data)
- Information of a prescription value and a standard value to be compared with a measurement value during optical inspection (the power and the thickness) of a final product, and information for inspecting a dyeing color and an antireflection film type (final inspection processing data)
- Processing information related to a frame shape and a V-block type (processing data for edging and V-block processing)
- Information of standard values of a circumferential length and an angle of the lens, and standard values of a V-block circumferential length and angle (edging/V-block processing inspection processing data)
- Print information (shipping processing data) related to a client name and a shipping address for issuing a state of delivery The spectacle lens prescription information including the spectacle prescription data, and the created design data and processing data is associated with the lens identification information, and is recorded in the design information database 202 (step S4).

Next, the lens blank is selected based on the design data (step S5). A lens blank is selected as a blank having such a blank outer diameter that, when a fitting center of a frame shape, and a geometric center are matched on a circular blank, a frame shape fits, and an outer diameter of the blank is minimum. The lens blank selected in this way is housed in a tray and conveyed, and a subsequent process is performed. A tray identification code is assigned to each tray, and, when the lens blank is housed, the tray identification code is associated with associated lens identification information in the design information database 202 and recorded. The tray identification code is also indicated in the tray or the operation instruction conveyed together with the tray.

Next, the concave surface of the lens blank is blocked by the lens holder (step S6). That is, the reading device 263 first reads the tray identification code, and obtains the lens blocking processing data associated with the tray identification code by referring to the design information database 202. Furthermore, the lens holder is selected based on the obtained processing data, and the lens blank is mounted in the lens holder at an angle designated by the processing data. The lens blank is mounted in the lens holder by taping a scratch prevention protection film on the concave surface of the blank in advance, pouring a low-melting point alloy (referred to as an alloy below) between the lens holder and the lens blank, and solidifying the alloy. In addition, when the convex surface is processed, as the alloy, an alloy whose main component is indium is used for fixing, and, when the concave surface is processed, it is preferable to use a wax. The lens blank in which the lens holder is mounted is housed in the tray again.

Next, the convex surface is machined and processed (step S7). That is, the control terminal 210 first causes the reading device 213 to read the tray identification code displayed on the tray. When reading the tray identification code, the control terminal 210 obtains machining/polishing processing data associated with the tray identification code from the design information database 202. Furthermore, the lens blank is mounted in the curve generator 211 which performs three-dimensional NC control with the lens holder interposed therebetween, and the control terminal 210 controls the curve generator 211 based on the processing data to machine and process a surface on a convex surface side to a predetermined convex surface shape.

Next, the blank whose convex surface has been machined and processed is mounted in the sanding polishing machine 212, and the control terminal 210 controls the sanding polishing machine 212 based on the machining/polishing processing data to finish the convex surface as a desired spherical surface or a free-form surface (step S8).

Figure 5:
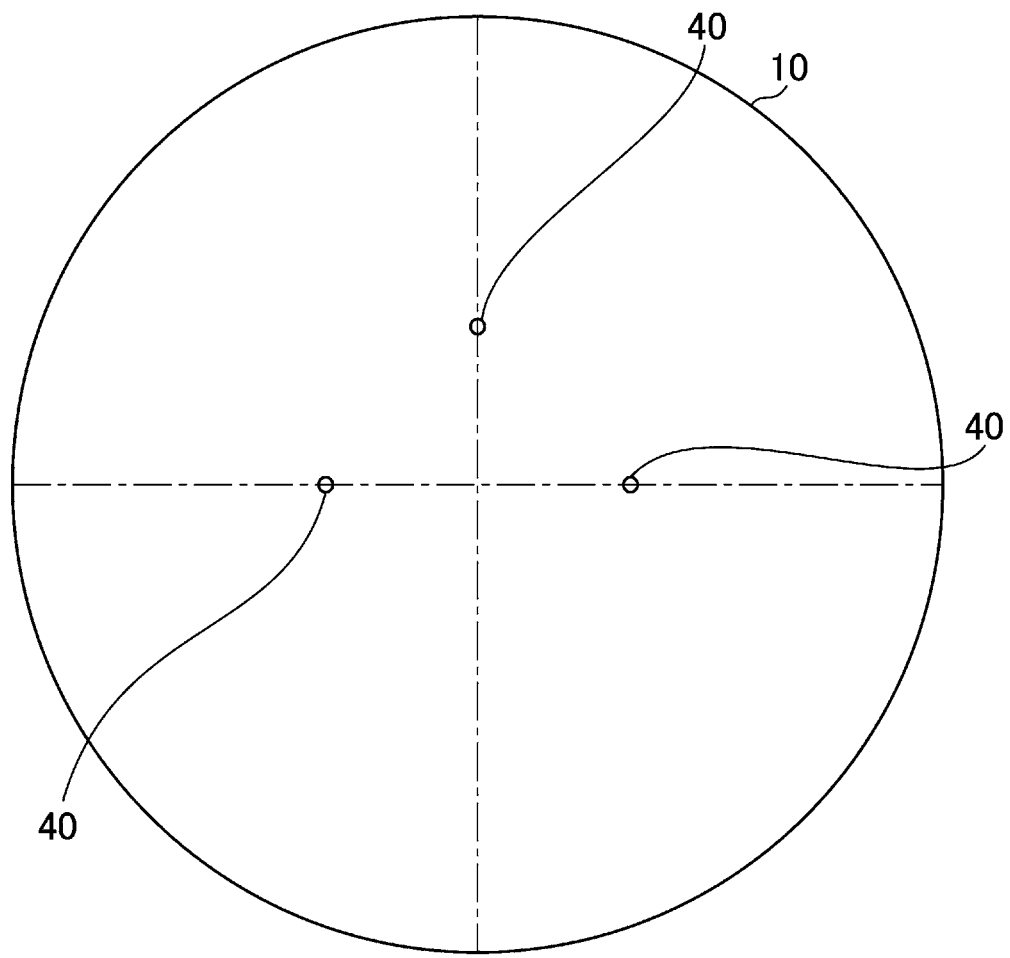
FIG. 5 illustrates a view illustrating a convex surface of the lens blank.

Next, target marks are printed on the convex surface of the lens blank for which polishing has been finished (step S9). FIG. 5 illustrates a view illustrating the convex surface of the lens blank. As illustrated in FIG. 5, target marks 40 are printed from a center to an upper side of the lens blank, and at positions at predetermined distances on both sides in a horizontal direction. In addition, distances from the center of the lens blank to the target marks 40 are preferably shorter than distances from the center of the lens blank to the alignment reference marks 31a and 32a. In addition, the target marks 40 are printed by, for example, an ink jet, a stamp or a pen.

Next, laser marking is performed (step S10). That is, the control terminal 230 first causes the reading device 233 to read the tray identification code displayed on the tray. When reading the tray identification code, the control terminal 230 obtains laser marking processing data associated with the tray identification code from the design information database 202. Furthermore, the control terminal 230 causes the image processing device 232 to detect a lens position and angle based on the positions of the target marks 40 of the lens blank. Furthermore, the control terminal 230 controls the laser marking device 231 based on the processing data to perform laser marking of the processing information mark, the progressive power information mark and the identification information mark described with reference to FIG. 3 on the convex surface of the lens blank.

Next, the lens blank (semi-finished lens blank) subjected to laser marking is immersed in hot water of approximately 70° C., the alloy is melted, and the lens holder is removed from the semi-finished lens blank (step S11).

Next, the semi-finished lens blank is blocked (step S12). That is, the reading device 263 first reads the tray identification code marked on the convex surface of the semi-finished lens blank, and obtains the lens blocking processing data associated with the tray identification code by referring to the design information database 202. Furthermore, the lens holder is selected based on the obtained processing data, and the semi blank is mounted in the lens holder at an angle designated by the processing data. When the semi-finished lens blank is mounted, the image processing device 232 detects the positions of the target marks 40 of the semi-finished lens blank, the reference mark is positioned to align with a reference line of the lens holder, and for machining and polishing the concave surface, the convex surface is mounted in the lens holder.

Next, the concave surface is machined and processed (step S13). That is, the control terminal 210 first causes the reading device 213 to read the tray identification code marked on the convex surface of the semi-finished lens blank. When reading the tray identification code, the control terminal 210 obtains machining/polishing processing data associated with the tray identification code from the design information database 202. Furthermore, the lens blank is mounted in the curve generator 211 which performs three-dimensional NC control with the lens holder interposed therebetween, and the control terminal 210 controls the curve generator 211 based on the processing data to machine and process a surface on a concave surface side to a predetermined concave surface shape.

Next, a concave surface polishing process is performed (step S14). Next, the blank whose concave surface has been machined and processed is mounted in the sanding polishing machine 212, and the control terminal 210 controls the sanding polishing machine 212 based on the machining/polishing processing data to finish the concave surface as a desired spherical surface or a free-form surface. Thus, an uncut lens is made.

Next, the uncut lens is immersed in hot water of approximately 70° C., the alloy is melted, and the lens holder is removed from the uncut lens (step S15).

Next, the uncut lens is washed to remove foreign materials adhered to the lens surface (step S16).

Next, the uncut lens is subjected to optical and surface inspection (step S17). More specifically, the control terminal 220 first causes the reading device 223 to read the tray identification code marked on the convex surface of the uncut lens. When reading the tray identification code, the control terminal 220 obtains inspection processing data associated with the tray identification code from the design information database 202. Next, the uncut lens is mounted in the lens meter 221. The control terminal 220 compares the aberration and the power measured by the lens meter 221 and the standard value of the processing data, and decides whether or not predetermined optical capability has been able to be obtained. Next, the uncut lens is mounted in the thickness meter 222. The control terminal 220 compares the thickness of the uncut lens measured by the thickness meter 222 and the standard value of the processing data, and decides whether or not the uncut lens has been molded into a predetermined lens shape. Furthermore, an external appearance of the uncut lens is inspected by visual checking. In this case, even if the uncut lens has a failure and when this failure is on the outer side of the marked shape line 3, it is possible to decide that the failure does not influence capability of the spectacle lens.

Next, a dyeing process is performed (step S18). That is, the display terminal 260 first causes the reading device 263 to read the tray identification code marked on the convex surface of the uncut lens. When reading the tray identification code, the display terminal 260 obtains and displays dyeing processing data associated with the tray identification code from the design information database 202. The operator immerses the uncut lens in a dye of a designated color type and density over a designated dyeing time based on this displayed dyeing processing data. In addition, in this case, the upper and lower sides of the spectacle lens can be distinguished based on the position marks 34, so that it is possible to immerse the uncut lens in the dye in a state where the upper and lower sides are right.

Next, a hard coating process is performed (step S19). That is, the display terminal 260 first causes the reading device 263 to read the tray identification code marked on the convex surface of the uncut lens. When reading the tray identification code, the display terminal 260 obtains and displays hard coating processing data associated with the tray identification code from the design information database 202. The operator immerses the uncut lens in a hard coating of a designated type based on this displayed hard coating processing data, calcinates the uncut lens and forms a hard film on the lens surface. In addition, in the hard coating process, hard coating processing is performed on multiple spectacle lenses at a time. In this case, the reading device 263 reads the tray identification code marked on the convex surface of the uncut lens, so that it is possible to prevent mix-up.

Next, an AR coating process is performed (step S20). That is, the display terminal 260 first causes the reading device 263 to read the tray identification code marked on the convex surface of the uncut lens. When reading the tray identification code, the display terminal 260 obtains and displays AR coating processing data associated with the tray identification code from the design information database 202. The operator forms a film forming material of a designated material on the surface of the uncut lens by a vacuum deposition method based on this displayed AR coating processing data. In addition, in the AR coating process, AR coating processing is performed on multiple spectacle lenses at a time. In this case, the reading device 263 reads the tray identification code marked on the convex surface of the uncut lens, so that it is possible to prevent mix-up.

Next, the uncut lens is finally inspected (step S21). More specifically, the control terminal 220 first causes the reading device 223 to read the tray identification code marked on the convex surface of the uncut lens. When reading the tray identification code, the control terminal 220 obtains final inspection processing data associated with the tray identification code from the design information database 202. Next, the uncut lens is mounted in the lens meter 221. The control terminal 220 compares the aberration and the power measured by the lens meter 221 and the standard value of the processing data, and decides whether or not predetermined optical capability has been able to be obtained. Next, the uncut lens is mounted in the thickness meter 222. The control terminal 220 compares the thickness of the uncut lens measured by the thickness meter 222 and the standard value of the processing data, and decides whether or not the uncut lens has been molded into a predetermined lens shape. Furthermore, whether or not the dyeing color and the antireflection film are formed as designated is inspected based on the processing data. Furthermore, an external appearance of the uncut lens is inspected by visual checking. In this case, even if the uncut lens has a failure and when this failure is on the outer side of the marked shape line 3, it is possible to decide that the failure does not influence capability of the spectacle lens.

Next, the uncut lens is blocked (step S22). That is, the reading device 263 first reads the tray identification code marked on the convex surface of the uncut lens, and obtains the lens blocking processing data associated with the tray identification code by referring to the design information database 202. Furthermore, the lens holder is selected based on the obtained processing data, and the uncut lens is mounted in the lens holder at an angle designated by the processing data. When the uncut lens is mounted, the image processing device 232 detects the positions of the target marks 40 of the uncut lens, the reference mark is positioned to align with a reference line of the lens holder, and for machining and polishing the concave surface, the convex surface is mounted in the lens holder.

Next, the control terminal 240 first causes the reading device 243 to read the tray identification code marked on the convex surface of the uncut lens. Furthermore, the uncut lens fixed to a lens block jig and tool is attached to the chuck interlock 242. Furthermore, to learn a position (inclination) of the uncut lens in a state where the uncut lens is attached to the chuck interlock 242, at least positions of three points of the lens surface (or back surface) designated in advance are measured (step S23). Measured values obtained herein are recorded together with the tray identification code used as the calculation data in step S24 in the design information database 202.

Next, the spectacle lens design device 201 performs V-block processing design calculation. In this regard, actual processing produces an error between the position of the uncut lens learned by calculation and an actual position of the uncut lens in some cases, and therefore this error is corrected at a point of time at which coordinate conversion into a processing coordinate has been finished. That is, the spectacle lens design device 201 corrects the error between the position of the uncut lens learned by calculation and the actual position of the uncut lens based on the measurement values of the positions of the three positions measured in step S23, calculates a final three-dimensional V-block distal end shape, and updates the processing data for edging and V-block processing associated with the tray identification code recorded in the design information database 202 (step S24).

Next, the lens grinding device 241 obtains the processing data for edging and V-block processing associated with the tray identification code by referring to the design information database 202. Furthermore, the lens grinding device 241 performs edging processing and V-block processing of the uncut lens according to the received processing data for edging and V-block processing (step S25).

Next, the control terminal 250 first causes the reading device 253 to read the tray identification code marked on the convex surface of the uncut lens. Furthermore, the control terminal 250 obtains the edging/V-block processing inspection processing data associated with the tray identification code by referring to the design information database 202. Next, the control terminal 250 causes the shape measurement instrument 251 to measure the circumferential length and the angle of the lens (spectacle lens) for which edging processing and V-blocking processing have been finished, and the circumferential length and the shape of the V-block top (step S26).

Furthermore, the control terminal 250 decides whether or not the circumferential length and the angle of the lens (spectacle lens) measured in step S26, and the circumferential length and the shape of the V-block top are within the standard values based on the obtained edging/V-block processing inspection processing data. Furthermore, when the circumferential length and the angle of the lens, and the circumferential length and the shape of the V-block top are within the standard values, the control terminal 250 decides that the edging processing and the V-block processing have been performed with sufficient accuracy (step S27). Also, the control terminal 250 checks the external appearance as to whether or not the edging processing produces scratches, burrs and defects of the spectacle lens.

Next, the control terminal 270 first causes the reading device 273 to read the tray identification code marked on the convex surface of the uncut lens. Furthermore, the control terminal 270 obtains the shipping processing data associated with the tray identification code by referring to the design information database 202. Furthermore, the control terminal 270 causes the printer 271 to print information related to the statement of delivery and the shipping address (spectacle shop). Furthermore, the lens is wrapped together with the statement of delivery, and the information related to the shipping address is attached to the wrapping to ship the lens (step S28).

In addition, when the uncut lens is shipped without being processed into the shape of the spectacle frame, steps S22 to S27 can be skipped. Furthermore, the above embodiment has described the case where the spectacle lens is produced from the lens blank, yet is applicable to a case, too, where a spectacle lens is produced from a semi-finished lens blank. In this case, steps S5 to 8 may be skipped. Furthermore, the tray identification code is read in each of the above steps. However, the embodiment is not limited to this, and lens identification information may be read.

If a spectacle lens is broken, for example, the identification number 35A indicated on the spectacle lens is read by using a magnifying glass. Furthermore, a user terminal sends an identification number to the order terminal 301 of the spectacle shop 100 or the assist terminal 302 of a manufacturer. A staff of the spectacle shop 100 or the manufacturer confirms the user based on user information of lens identification information associated with the identification number by referring to the design information database 201. Furthermore, above-described steps S5 to S28 are executed to ship a spectacle lens having the same shape as that of the broken spectacle lens to the user or the spectacle shop. In addition, a method for reading the identification number 35A is not limited to a reading method using the magnifying glass. For example, a method for importing an image obtained by a camera into a PC and decoding the image, and a method for reading an identification number by attaching a loupe to a smartphone can be used.

Furthermore, spectacle shops and manufacturers perform client management and complaint handling by referring to the design information database 201 from the assist terminal 302.

As described above, according to the present embodiment, the identification mark 35 for identifying the spectacle lens, and the processing information mark which is used to process the lens blank and includes the tray identification 2D code 33*a*, the tray identification code 33*b*, the shape line 3 and the position mark 34 are marked by laser before the concave surface machining processing process (step S13), so that it is possible to mark the identification mark 35 and the processing information mark in one process, and reduce a laser marking work. Furthermore, it is possible to mark the processing information mark and mark the identification mark 35 together, and one laser irradiation device can perform this marking, so that it is possible to reduce maintenance cost of the laser irradiation device.

Furthermore, according to the present embodiment, the identification mark 35 is marked in an area of the lens material to be used as the spectacle lens. Therefore, the identification mark 35 is left on the spectacle lens of a finished product. Even when, for example, the spectacle lens is broken, it is possible to easily reproduce the spectacle lens by reading the lens identification information from the identification mark 35.

Furthermore, according to the present embodiment, the processing information mark includes the tray identification code 33*b* associated with the lens material, the spectacle lens prescription information is associated with the tray identification code 33*b* and recorded in the design information database 202, the tray identification code 33*b* is marked on the outer side of the area of the lens material to be used as the spectacle lens, the tray identification code 33*b* is read in the concave surface machining processing process, the spectacle lens prescription information (processing data) associated with the tray identification code 33*b* is obtained by referring to the design information database 202, and the concave surface is machined based on this spectacle lens prescription information. Thus, according to the present embodiment, the tray identification code 33*b* marked on the lens blank is read in each process, and the spectacle lens prescription information (processing data) associated with the tray identification code 33*b* is obtained to perform processing, so that it is possible to minimize the instruction.

Furthermore, according to the present embodiment, the spectacle lens prescription information is associated with the lens identification information associated with the identification mark 35 and is recorded in the design information database 202, and the present embodiment includes a process of reading the identification mark 35 marked on the spectacle lens, and a process (S5 to S28) of reproducing the spectacle lens based on the spectacle lens prescription information associated with the read identification mark 35. Consequently, it is possible to easily reproduce the spectacle lens.

In addition, the present embodiment is not limited to the above-described embodiment, and may be changed as appropriate within the technical scope of the present disclosure. For example, the present embodiment has described the example where convex surface polishing (S8) and concave surface polishing (S14) are performed. However, these polishing processes may not be performed, and surfaces may be finished by convex surface machining processing (S7) and concave surface machining processing (S13).

Furthermore, the present embodiment has described the example where both of the convex surface and the concave surface of the lens blank are machined and polished, yet is not limited to this. Depending on a product, the convex surface of the lens blank may be finished by cast molding, and only the concave surface may be machined and polished without machining and polishing the convex surface. In this case, the process (S6 to S8) of processing the convex surface according to the present embodiment is not performed. Furthermore, the concave surface of the lens blank may be finished by cast molding, and only the convex surface may be machined and polished without machining and polishing the concave surface. In this case, the process (S12 to S15) of processing the concave surface according to the present embodiment is not performed. Furthermore, both of the convex surface and the concave surface of the lens blank may be finished by cast molding, and dyeing and coating processing may be performed without machining and polishing the convex surface and the concave surface. In this case, the process (S6 to S8) of processing the convex surface and the process (S12 to S15) of processing the concave surface according to the present embodiment are not performed.

Furthermore, according to the present embodiment, the diameter of a dot formed by laser is less than 70 μm. Consequently, identification information left on the spectacle lens becomes very little, so that aesthetics is not undermined, and a user of a spectacle does not have a feeling that something is wrong.

Furthermore, according to the present embodiment, the depth of the dot formed by laser is 0.1 μm or more and 3 μm is less. According to this dot dimension, even when dyeing, hard coating and AR coating are applied to the lens, each mark can be viewed.

The method for producing the spectacle lens according to the present disclosure will be summarized below.

One embodiment of the present invention is a method for producing a spectacle lens from a lens material, and includes: a marking process (step S10) of marking the identification mark 35 for identifying the spectacle lens, and the processing information mark which is used to process the lens blank and includes the tray identification 2D code 33*a*, the tray identification code 33*b*, the shape line 3 and the position mark 34 by forming the hole or the groove in the convex surface of the lens material by laser; and the concave surface machining processing process (step S13) of reading the processing information mark, and machining the concave surface of the lens blank based on the read processing information mark.

Furthermore, one embodiment of the present invention is the system 1 which produces the spectacle lens from the lens material, and includes: the design information database 202 in which the identification information mark 35 for identifying the spectacle lens and a prescription of the spectacle lens are associated and recorded; the laser marking device 231 which marks the identification mark 35 for identifying the spectacle lens, and the processing information mark which is used to process the lens material and includes the tray identification 2D code 33*a*, the tray identification code 33*b*, the shape line 3 and the position mark 34 by forming the hole or the groove in the convex surface of the lens material by laser; and the curve generator 211 which reads the processing information mark, and machines the concave surface of the lens material based on the read processing information mark.

What is claimed is:

1. A method for producing a spectacle lens from a lens material, the method comprising:
- a marking step of marking an identification information mark and a processing information mark in a convex surface of the lens material by pulse laser, the identification information mark being used for identifying the spectacle lens and the processing information mark being used to process the lens material;
- a concave surface machining step of reading the processing information mark, and machining a concave surface of the lens material based on the read processing information mark; and
- a hardcoating step of forming a hard film on the lens, wherein:
- a part of the identification information mark is constituted by an unique number assigned to the spectacle lens,
- the unique number of the identification information mark is marked in an area of the lens material to be used as the spectacle lens, and is constituted by dots separated from each other and formed by pulse irradiation of the pulse laser,
- the processing information mark includes an identification code marked on an outer side of an area of the lens material to be used as the spectacle lens,
- a diameter of each of the dots is 5 µm or more and 30 µm or less, and
- a depth of each of the dots is 0.1 µm or more and 3 µm or less.

2. The method for producing the spectacle lens according to claim 1, further comprising a convex surface machining step of machining the convex surface before the marking step.

3. The method for producing the spectacle lens according to claim 1, wherein
- spectacle lens prescription information is associated with the identification code and recorded in a design information database,
- the identification code is marked on an outer side of an area of the lens material to be used as the spectacle lens, and
- in a concave surface polishing step, the identification code is read, the spectacle lens prescription information associated with the identification code is obtained by referring to the design information database, and the concave surface is polished based on the spectacle lens prescription information.

4. The method for producing the spectacle lens according to claim 1, wherein
- spectacle lens prescription information is associated with lens identification information associated with the identification information mark and is recorded in a design information database, and
- the method further comprises:
- a step of reading the identification information mark marked on the spectacle lens; and
- a step of reproducing the spectacle lens based on the spectacle lens prescription information associated with the read identification information mark.

5. The method for producing the spectacle lens according to claim 1, further comprising at least one step of reading the processing information mark, and performing one of dyeing, coating, edging processing and V-block processing on the lens whose concave surface has been machined based on the read processing information mark.

6. A system which produces a spectacle lens from a lens material, the system comprising:
- a design information database in which an identification information mark for identifying the spectacle lens and prescription information of the spectacle lens are associated and recorded;
- a marking device which marks the identification information mark and a processing information mark in a convex surface of the lens material by pulse laser, the processing information mark being used to process the lens material; and
- a concave surface machining device which reads the processing information mark, and machines a concave surface of the lens material based on the read processing information mark, wherein:
- a part of the identification information mark is constituted by an unique number assigned to the spectacle lens,
- the unique number of the identification information mark is marked in an area of the lens material to be used as the spectacle lens, and is constituted by dots separated from each other and formed by pulse irradiation of the pulse laser,
- the processing information mark includes an identification code marked on an outer side of an area of the lens material to be used as the spectacle lens,
- a diameter of each of the dots is 5 µm or more and 30 µm or less, and
- a depth of each of the dots is 0.1 µm or more and 3 µm or less.

7. A spectacle lens which is formed by machining a concave surface of a lens material, including a hard film on the lens material, wherein:
- an identification information mark and a processing information mark are marked in a convex surface, the identification information mark being used for identifying the spectacle lens and the processing information mark being used to process the lens material,
- a part of the identification information mark is constituted by an unique number assigned to the spectacle lens,
- the unique number of the identification information mark is marked in an area of the lens material to be used as the spectacle lens, and is constituted by dots separated from each other,
- the processing information mark includes an identification code marked on an outer side of an area of the lens material to be used as the spectacle lens,
- a diameter of the dots is 5 µm or more and 30 µm or less, and
- a depth of each of the dots is 0.1 µm or more and 3 µm or less.

8. The method for producing the spectacle lens according to claim 1, wherein when the pulse width is equal to or more than $10^{-9}$ seconds and less than $10^{-6}$ seconds, a wavelength is set to 266 nm.

9. The method for producing the spectacle lens according to claim 1, wherein when the pulse width is equal to or more than $10^{-12}$ seconds and less than $10^{-9}$ seconds, a wavelength is set to 532 nm or 355 nm.

10. The method for producing the spectacle lens according to claim 1, wherein when the pulse width is equal to or more than $10^{-15}$ seconds and less than $10^{-12}$ seconds, a wavelength is set to 532 nm or 355 nm.

* * * * *